March 21, 1961 W. T. PURVANCE 2,975,735
AGRICULTURAL IMPLEMENT FOR CONDITIONING SOIL
Filed April 2, 1958
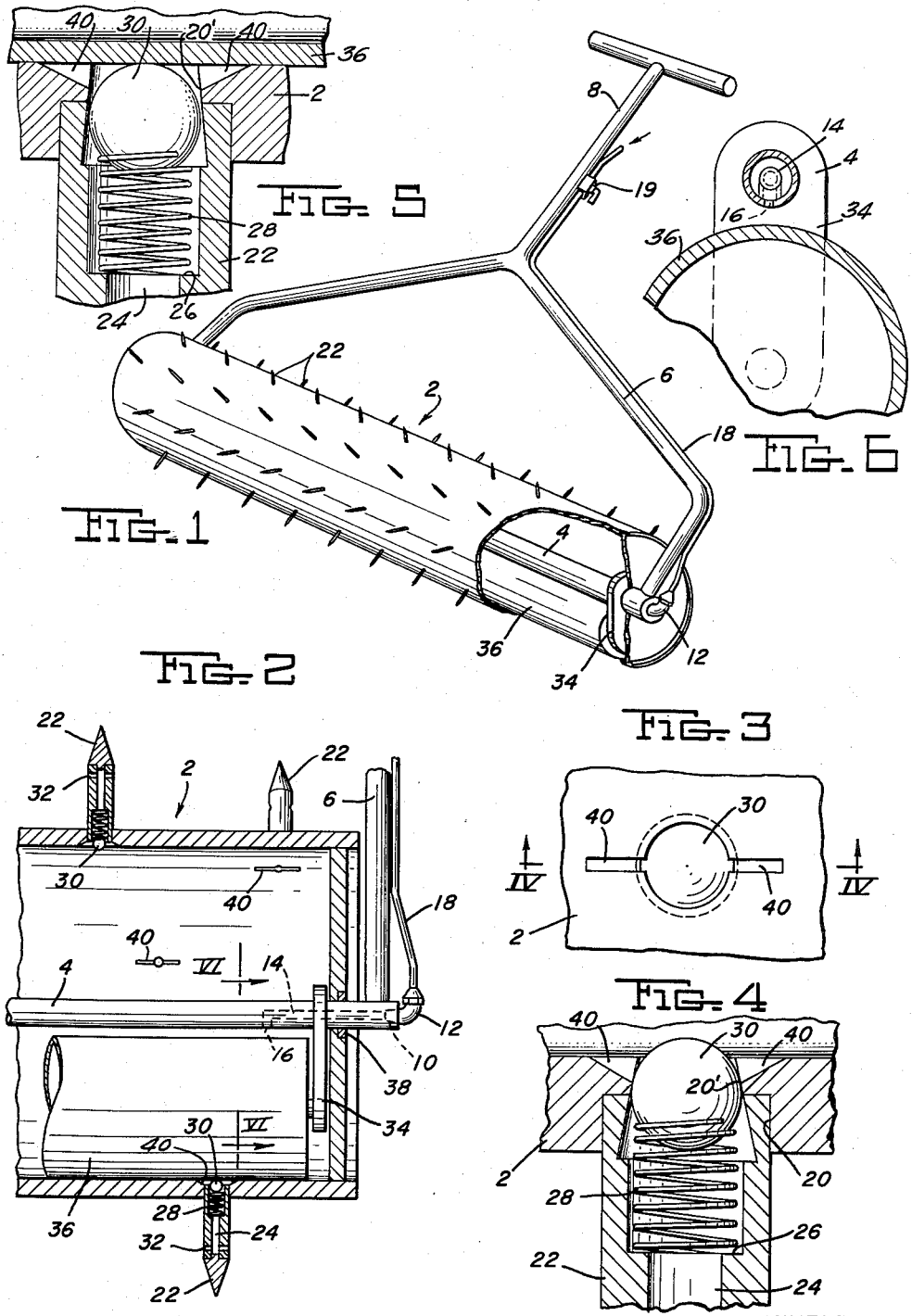
INVENTOR
WILLIAM T. PURVANCE
By Donald G. Dalton
Attorney

United States Patent Office 2,975,735
Patented Mar. 21, 1961

2,975,735
AGRICULTURAL IMPLEMENT FOR
CONDITIONING SOIL

William T. Purvance, Provo, Utah, assignor to United
States Steel Corporation, a corporation of New Jersey Filed Apr. 2, 1958, Ser. No. 725,997
5 Claims. (Cl. 111—6)

The present invention relates generally to agricultural equipment and has as its principal object the provision of an improved agricultural implement especially suitable for simultaneously rolling, aerating and fertilizing soil.

The above and other objects will become more apparent after referring to the following specification and attached drawings, in which:

Figure 1 is a view in perspective of the device of the invention;

Figure 2 is an enlarged partial longitudinal sectional view of the roller drum of the device of the invention;

Figure 3 is a top plan view of a spike of the invention;

Figure 4 is a partial sectional view taken on the line IV—IV of Figure 3 showing the ball valve in closed position;

Figure 5 is a view similar to Figure 4 showing the ball valve in open position; and Figure 6 is a cross sectional view taken on the line VI—VI of Figure 2.

Referring more particularly to the drawings reference numeral 2 designates the roller drum of the invention which is in the form of a closed-end cylinder rotatably mounted on a hollow axle 4. The ends of the axle project outwardly of the ends of the drum 2 and are connected with a draw bail 6 to which a handle 8 is attached for propelling drum 2 along the surface of the soil to be conditioned.

An inlet 10 is provided in one end of the hollow axle 4 for receiving a fluid inlet fitting 12. A tube 14 extends in the interior of axle 4 from the inlet 10 to an opening 16 through the side wall of axle 4 intermediate the end walls of drum 2 for conducting liquid fertilizer or other agricultural liquids under pressure from the inlet 10 into the drum 2. The fitting 12 is adapted to be connected at its outer end to a liquid fertilizer supply tube 18. For convenience the supply tube may extend along the bail 6 and handle 8 to an inlet valve 19.

Staggered rows of holes 20 are provided through the wall of drum 2 around its circumference which occommodate soil-penetrating spikes 22. The upper portion of each hole 20 which communicates with the interior of drum 2 is reduced in diameter as at 20' for a purpose which will become apparent as this description proceeds. Each spike 22 is closed at its distal end and is provided with an axial passageway 24 having an enlarged diameter portion in the end of the spike adjacent the wall of the drum 2. The enlarged diameter portion of passageway 24 forms shoulders 26 which provide a bearing for one end of a helical compression spring 28 which is disposed in the enlarged diameter portion of the passageway. The opposite end of spring 28 bears against a ball 30 disposed in the enlarged portion of passageway 24. The reduced diameter upper portion 20' of the hole 20 provides a seat for the ball 30. The ball 30 has a diameter greater than the upper end opening 20' so that the ball normally seals the hole 20 as it is urged toward the interior of drum 2 by spring 28. Thus, the ball and spring elements in each spike constitute a spring-loaded ball valve.

Laterally directed outlets 32 which communicate with passageway 24 are provided in each of the spikes 22 adjacent its distal end.

A bracket 34 is rotatably attached to and depends from each end of the axle 4 within the drum 2 for rotatably supporting a roller 36 in the bottom half of the drum 2. The roller 36 is so dimensioned that the bottom portion of its periphery slidably contacts the inner wall of the bottom portion of the drum 2 as the latter is propelled along the ground.

A packing 38 may be provided around the hollow axle 4 adjacent the outer ends of the drum 2 to prevent leakage.

In operation, liquid fertilizer or other agricultural liquid under pressure is admitted to the interior of drum 2 through inlet valve 19, tube 18, fitting 12 and tube 14. After the drum 2 has been filled valve 19 is shut off and disconnected from the source (not shown) of the liquid fertilizer. The implement is then ready to be propelled along the surface of the soil to be treated. For propulsion, the implement of the invention may be pushed manually or drawn by a tractor or other machine.

As the drum 2 rolls along the surface of the soil being treated, the roller 36 depresses and opens each row of ball valves as it passes under the roller and the spikes penetrate the soil. A pair of slots 40 is provided adjacent each of the holes 20 which communicate with the interior of drum 2 and passageway 24 so as to insure an unrestricted flow of the liquid fertilizer past the roller 36 into the ball valves in the spikes as the valves pass under the roller. Each of the slots 40 fills up with the liquid fertilizer just prior to passing under the roller 36. As shown in Figure 5, the slots 40 communicate with the interior of the spike 22 when the ball 30 is depressed by the roller 36. Therefore, as each spike and ball valve passes under the roller 36 and the ball 30 is depressed, the liquid fertilizer flows from the slots 40 into the spike. It will be understood that only a very small amount of liquid fertilizer is required to pass into each spike as it penetrates the soil due to the number of spikes on the roller and their close proximity to each other. The roller is so dimensioned that it depresses the rows of ball valves only when the spikes containing the valves are penetrating the soil.

As the drum 2 is propelled along the surface of the soil as described above the drum rolls the soil surface, the spikes penetrate and aerate the soil, and the ball valves, passageways and outlets in the spikes cause liquid fertilizer or other agricultural liquid to be injected into the soil.

While one embodiment of my invention has been shown and described, it will be apparent that other adaptations and modifications may be made without departing from the scope of the following claims.

I claim:

1. An agricultural implement for injecting agricultural liquids into soil while rolling and aerating it which comprises a close-end hollow cylindrical drum adapted to contain liquid under pressure, a hollow tubular axle extending axially of said drum with its ends projecting outwardly of the drum, said drum being rotatably mounted on said axle, a liquid inlet in one projecting end of said axle, said axle having an opening through its sidewall intermediate its ends communicating with said inlet and the interior of said drum, a pair of spaced brackets rotatably attached to and depending from said axle in said drum, a roller journaled in the distal ends of said brackets and circumferentially engaging the bottom portion of the interior wall of said drum, a plurality of spikes each having a hollow bore attached to and projecting radially outwardly from said drum, the hollow bore of each spike being closed at its distal end and communicating with the interior of said drum at its other end, each of said spikes having liquid outlets communicating with said hollow bore adjacent its closed end, a spring-loaded ball valve in said other end of the bore of each of said spikes, each of said valves including a ball seal normally resiliently projecting into the interior of said drum, said projecting ball seal being engageable by said roller to open said valve momentarily as the spike containing the valve passes under said roller when the drum is circumferentially propelled along the ground and said last named spikes are imbedded in the soil to effect passage of liquid from the drum through the spike into the soil.

2. An agricultural implement as defined by claim 1 in which the hollow bore in each of the spikes includes an enlarged diameter portion adjacent its said other end forming a shoulder in the bore, the wall of said drum having a plurality of holes therethrough each for receiving one of said spikes, each of said holes being reduced in diameter at the end thereof adjacent the interior of said drum, said ends of said holes each having a diameter less than that of the enlarged internal diameter portion of the spike received in the hole, said ball seal of each of said valves being disposed in the enlarged diameter portion of the bore of its respective spike, said ball seal having a diameter slightly less than that of said enlarged internal diameter but greater than that of the reduced diameter portion of the hole in the drum wall receiving the spike, and a helical compression spring in the enlarged diameter portion of the bore of each of said spikes, said spring bearing against said shoulder at one end and against said ball seal at its other end to thereby constantly urge said ball seal into sealing engagement with the reduced diameter end of said hole.

3. An agricultural implement as defined by claim 2 characterized by the wall of said drum having longitudinal slots therein one on each side of each of said holes, each of said slots communicating at one end with the interior of said drum and at its other end with the portion of the bore of the spike received in the hole which contains said ball seal.

4. An agricultural implement as defined by claim 1 characterized by said spikes being arranged in staggered rows around the circumference of said drum.

5. An agricultural implement as defined by claim 1 including draw means pivotally attached to the closed ends of said hollow axle for propelling said drum along the surface of the soil to be treated.

References Cited in the file of this patent

UNITED STATES PATENTS

| | | |
|---|---|---|
| 1,171,277 | Thayer | Feb. 8, 1916 |
| 2,072,331 | Hanna | Mar. 2, 1937 |
| 2,543,888 | Bunch | Mar. 6, 1951 |

FOREIGN PATENTS

| | | |
|---|---|---|
| 1,107,575 | France | Aug. 10, 1955 |